(12) United States Patent
Maass

(10) Patent No.: US 6,347,827 B1
(45) Date of Patent: Feb. 19, 2002

(54) CONVERTIBLE VEHICLE

(75) Inventor: Joachim Maass, Bissendorf (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 09/531,200

(22) Filed: Mar. 20, 2000

(30) Foreign Application Priority Data

Mar. 19, 1999 (DE) .......................... 199 12 358

(51) Int. Cl.⁷ ................................. B60J 7/12
(52) U.S. Cl. ............. 296/107.09; 296/116; 296/107.08
(58) Field of Search ................ 296/107.09, 107.07, 296/146.14, 121, 122, 116, 107.08

(56) References Cited

U.S. PATENT DOCUMENTS 4,621,861 A * 11/1986 Scaduto ............. 296/107.09 X
6,048,021 A * 4/2000 Sautter, Jr. ......... 296/107.09 X

FOREIGN PATENT DOCUMENTS

GB 617923 * 2/1949 ............. 296/116
IT 330606 * 8/1936 ............. 296/116

* cited by examiner

*Primary Examiner*—Dennis H. Pedder
(74) *Attorney, Agent, or Firm*—Jordan and Hamburg LLP (57) ABSTRACT

A convertible vehicle with a roof, which can be stowed in the rear region of the vehicle and comprises at least one front roof part, which faces a windshield frame in the closed position, and a rear roof part, which extends backward and downward at the rear and has, at its side edge regions, frame parts, which are held at their rear end regions so that they can be swiveled about a horizontal axis. In such a vehicle, in order to increase the headspace for the passengers, especially in the case of four-seater convertible vehicles for the passengers on the rear seat, and to improve the optics in the connecting region of the folding top, without significantly enlarging the stowage space for the open folding top, provisions are made so that the axis mentioned lies above the window parapet in the closed position of the roof and, for this purpose, over connecting frame parts, which are linked to the rear end regions of the rear frame parts so that they can be swiveled, are at a distance from the main bearing, which is on the car body and about which the roof can be swiveled, at least one part region of the connecting frame part, lying above the window parapet, enclosing an obtuse angle with the window parapet in the driving direction.

11 Claims, 15 Drawing Sheets

FIG. 15

CONVERTIBLE VEHICLE

BACKGROUND OF THE INVENTION

The invention relates to a convertible vehicle. Such convertible vehicles have a roof, which can be folded and/or collapsed at least regionally and comprises several roof parts, which hang together and can be moved relative to one another. Side frame parts are assigned to the respective roof parts. They represent either a lateral boundary of a stationary roof part or are connected with one another over transverse hoops or the like. The roof parts can have a textile covering regionally or completely.

For four-seater convertibles of the type named above, at each side of the roof, the DE 196 39 567 A1 discloses the arranging of three consecutive frame parts, of which the front one, in the closed position, is supported on the windshield frame, the middle one assumes an essentially horizontal position for extending the roof in the region of the rear seat and the rear one extends downward at the rear and is held pivotably in the main bearing within the car body underneath the window parapet. When opened, such a roof is folded in Z-shape fashion and is stowed away. The rear parts of the frame intersect the window parapet at an acute angle.

SUMMARY OF THE INVENTION

It is an object of the invention to improve a convertible vehicle of the type named above, so that the headroom for the passengers is enlarged and the optics in the region connecting the folding top to the window parapet of the car body are improved, without significantly enlarging the space for stowing the opened folding top.

With the inventive construction of a convertible vehicle, the rear coupling axis of the frame parts of the rear part of the roof is shifted from where it is conventionally disposed at the main bearing into a region lying above and at a distance from the window parapet, so that the subsidence of the roof is decreased in the region of the rear frame parts. Due to the connecting frame part which, contrary to known rear frame parts, does not meet the window parapet at an acute angle in a direction opposite to the driving direction, the roof can be constructed so that, in side view, the roof region facing the side window meets the window parapet at an obtuse angle. With that, a softer transition is created between the roof and the car body. Moreover, this corresponds to a design element frequently employed in coupes with a fixed roof. As a result, the differences between the coupe and the convertible of a vehicle type are reduced.

The connecting frame part with the rear roof part is constructed in several pieces, so that the two parts can be swiveled relative to one another. By these means it is achieved that, when the roof is swiveled open, the connecting frame part does not assume an essentially vertical position and, relative to the rear part of the roof, a 90° offset position. This would lead to a very low position of the opened roof in the car body and, with that, to a decrease in the stowage area. Instead, because the rear part of the frame can be swiveled relative to the connecting frame part, these parts can be stored in an almost parallel position to one another in the opened state of the roof, so that the height of the inserted roof is not increased relative to a conventional version.

Further advantages and distinguishing features are evident from an example of the object of the invention, described in the following and shown in the accompanying drawings.

DESCRIPTION OF THE PREFERRED EMBODIMENTS

The example shows a four-seater convertible vehicle 1 with a roof 2. This comprises a front roof part 3, which is supported in the closed position with its front transverse region 4 at a windshield frame of the convertible vehicle 1, a middle roof part 5, which extends the roof 2 in the rear regions of the vehicle, and a rear roof part 6, which extends downward at the rear and is mounted in the region of a rear head rest 7, so that it can be swiveled about a horizontal axis 8. The roof parts 3, 5, 6 are in each case bounded at the side by lateral frame parts 9, 10, 11. In the example, the latter serve to stretch a textile covering, which extends between the frame parts 9, 10, 11 and is supported by the transverse hoop 12. Fixed or regionally fixed parts of the roof, which may also be covered with a textile material, are also possible.

It is furthermore also possible to construct a similar roof 2 for a two-seater convertible vehicle. In this case, it is possible to do without the middle part 5 of the roof, since the length of the roof 2 is decreased.

In the rear region, the roof 2 has an essentially vertically upright rear window 13; at the sides, two essentially triangular continuations 14 of the roof are provided, which are held under tension by clamps 15, so called fins, with respect to lid 16 of the box for the folding top. A conventional rear termination of a roof 2 with an inclined rear window 13 is also conceivable.

The horizontal swiveling axis 8 in the rear end region of the rear frame part 11 is at a vertical distance from the main bearing 17 and lies above a window parapet 18. In order to achieve the vertical distance, a connecting frame part 19 is provided in each case between the main bearing 17 and the rear end region of a rear frame part 11. The connecting frame part 19 is hinged at the rear frame part 11 to the swiveling axis 8 and held at the other main bearing 17 so that it can swivel.

Figure 1:
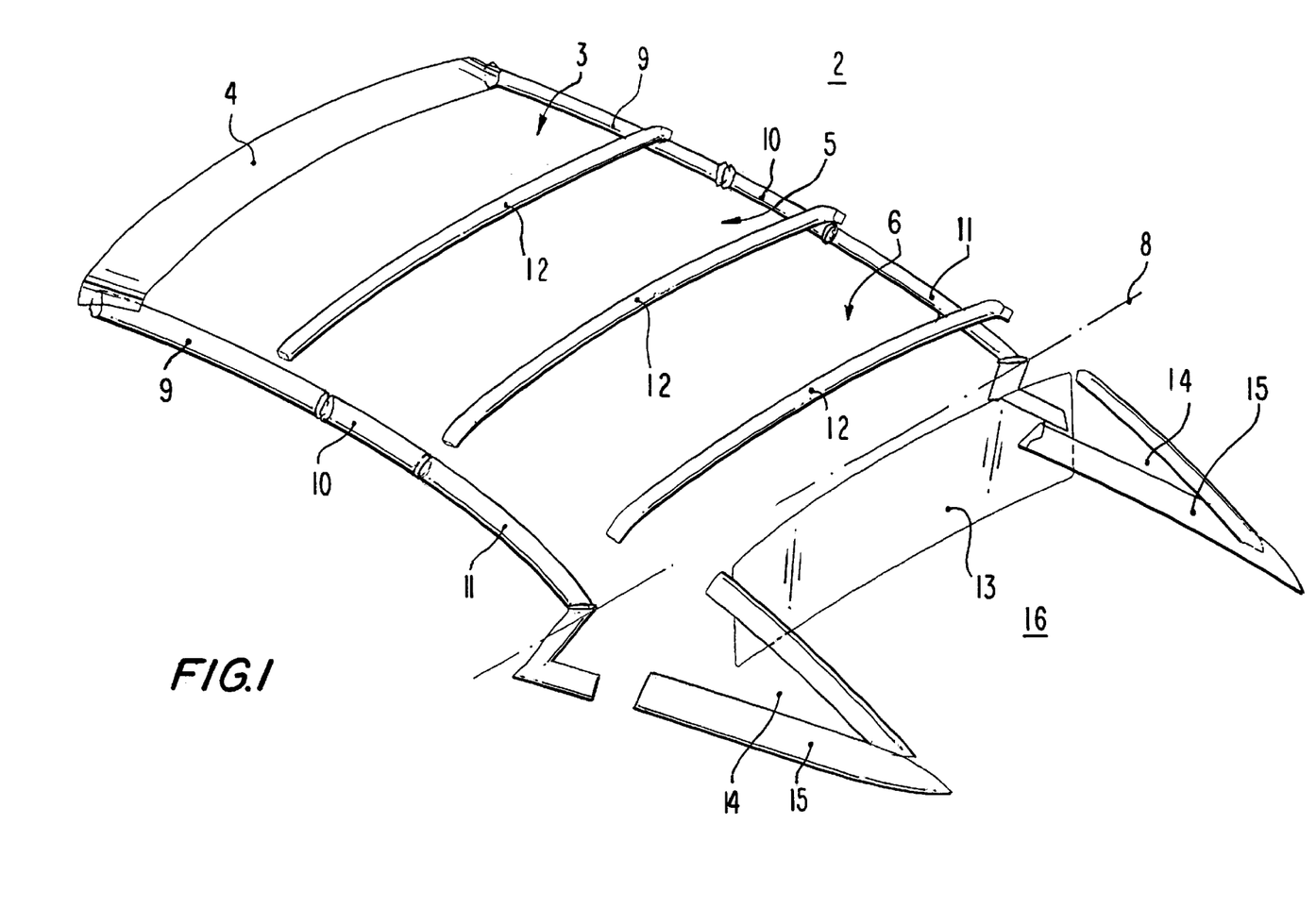
FIG. 1 shows a perspective view of a roof of an inventive convertible vehicle.
Figure 2:
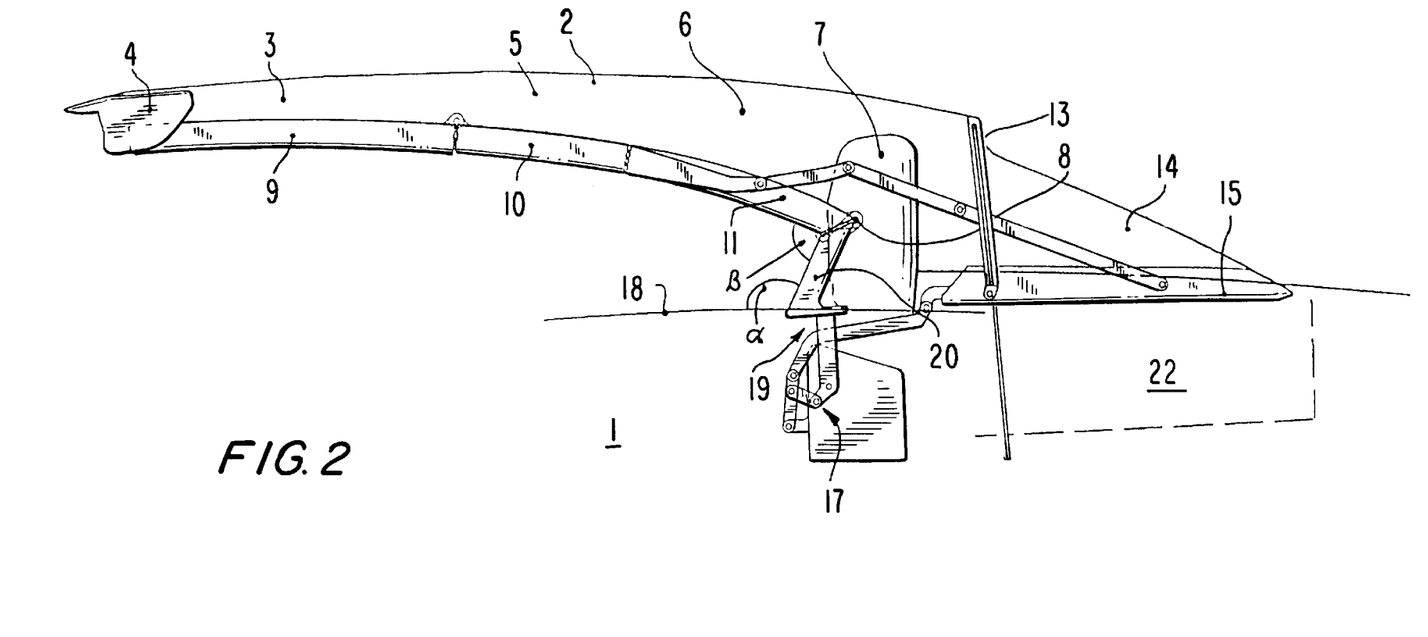
FIG. 2 shows a roof region of the convertible vehicle in a side view in the closed position.
Figure 3:
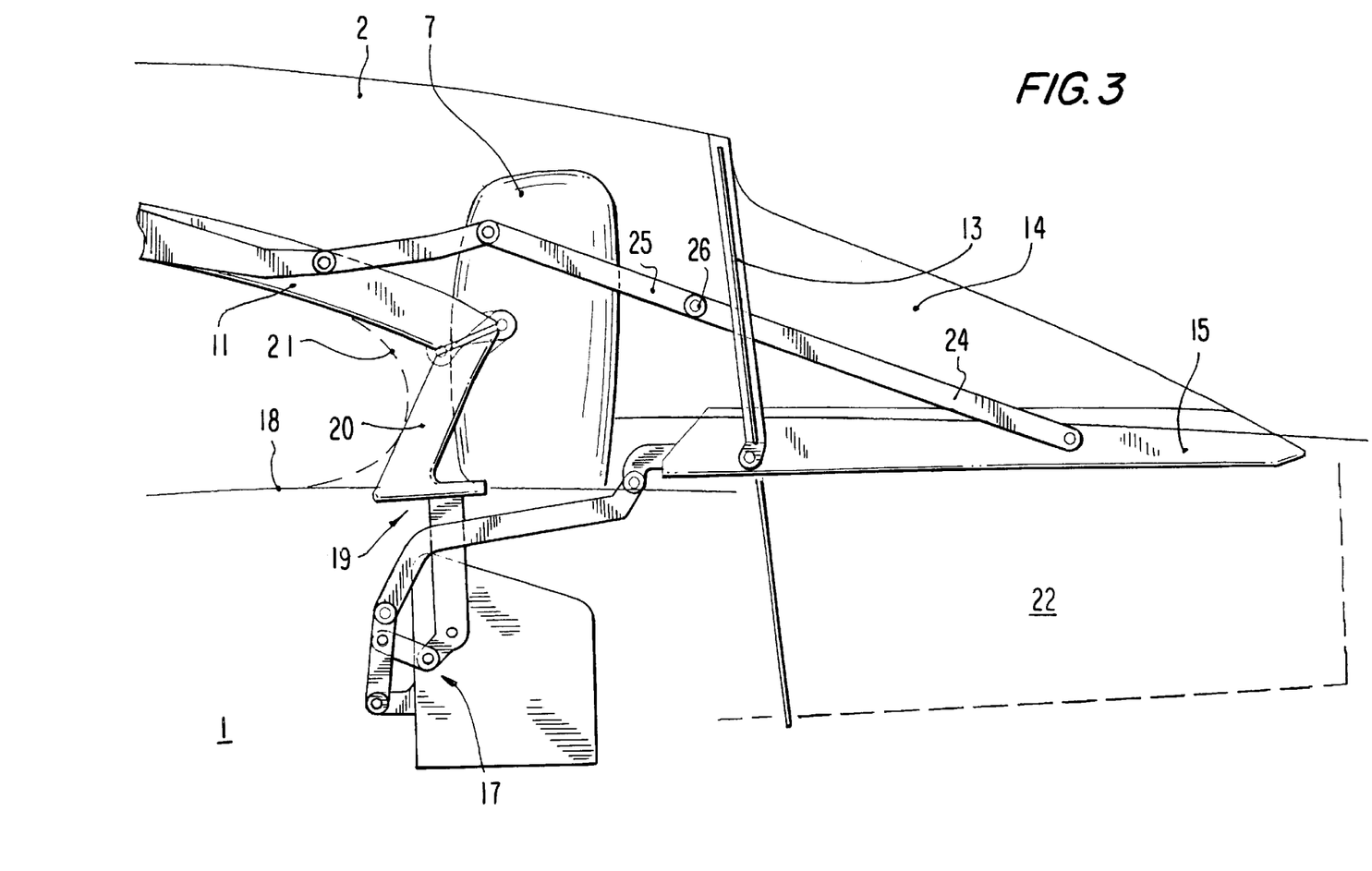
FIG. 3 shows a view of a detail of the rear region of the roof.
Figure 4:
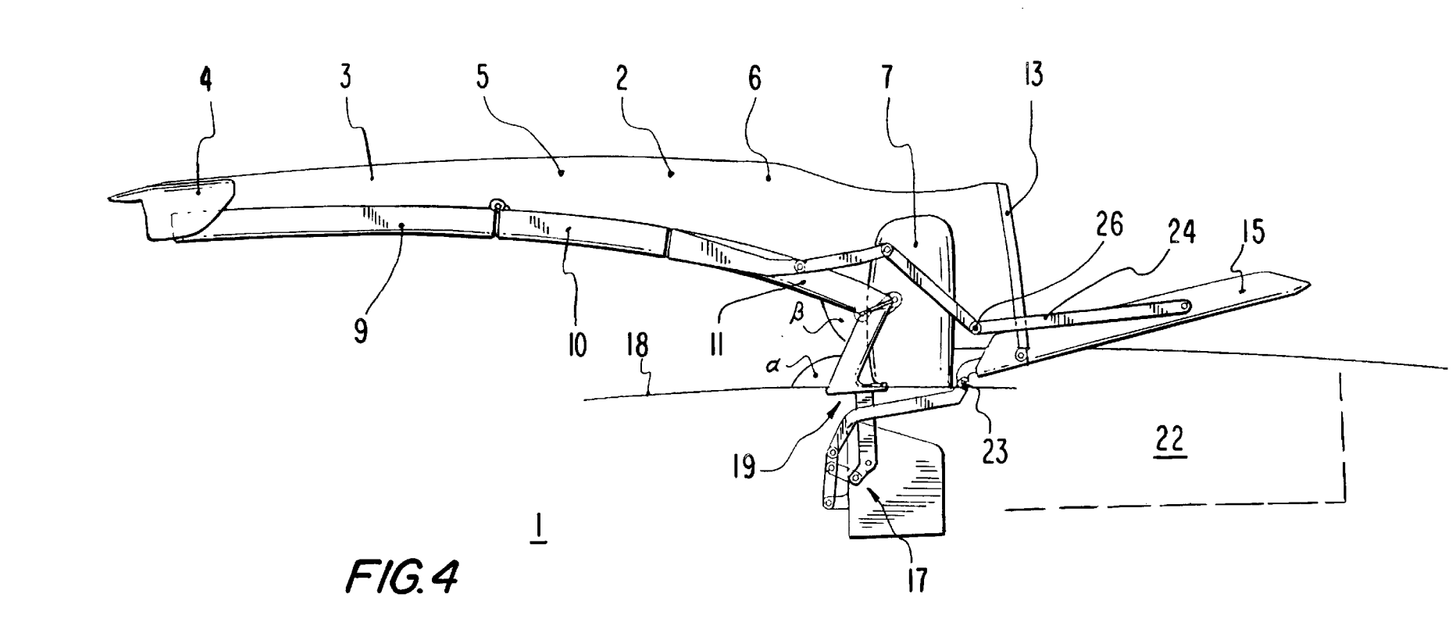
FIG. 4 shows a view similar to that of FIG. 2, while the folding top is being opened.
Figure 5:
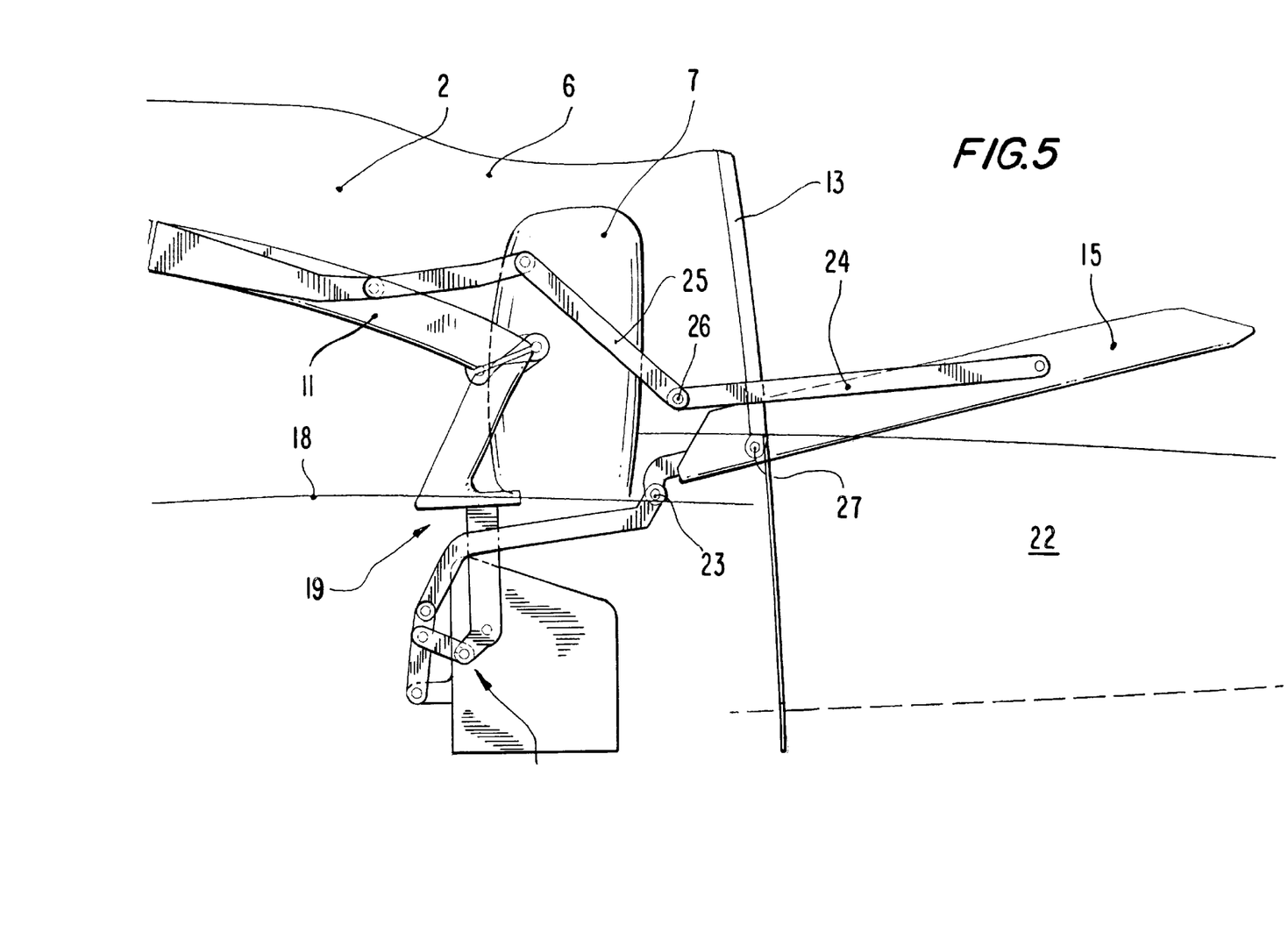
FIG. 5 shows a detailed view of the movement phase of FIG. 4.
Figure 6:
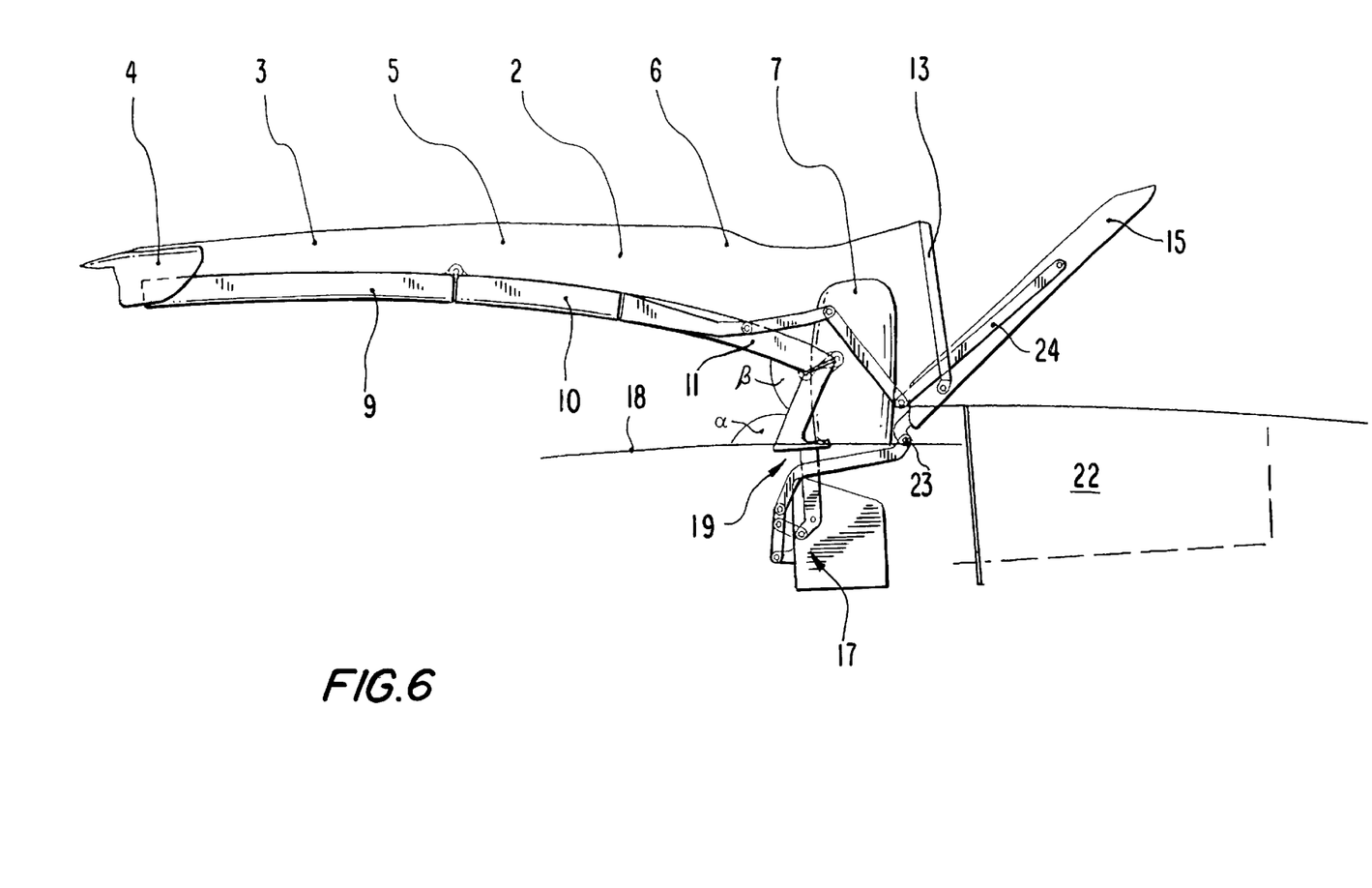
FIG. 6 shows a view, similar to that of FIG. 4, while the roof is being opened further.
Figure 7:
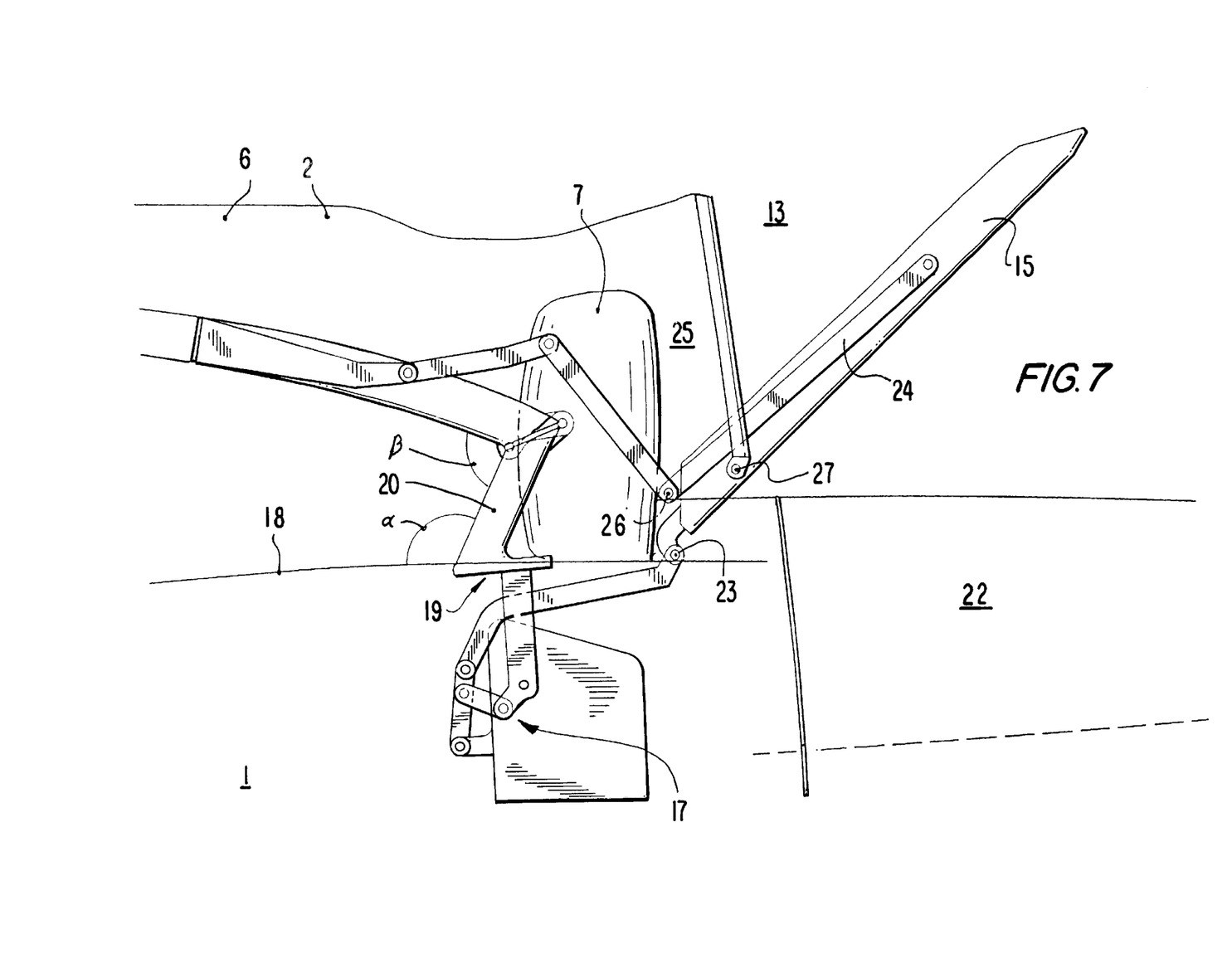
FIG. 7 shows a detailed view of the rear region of the roof in the movement phase of FIG. 6.
Figure 8:
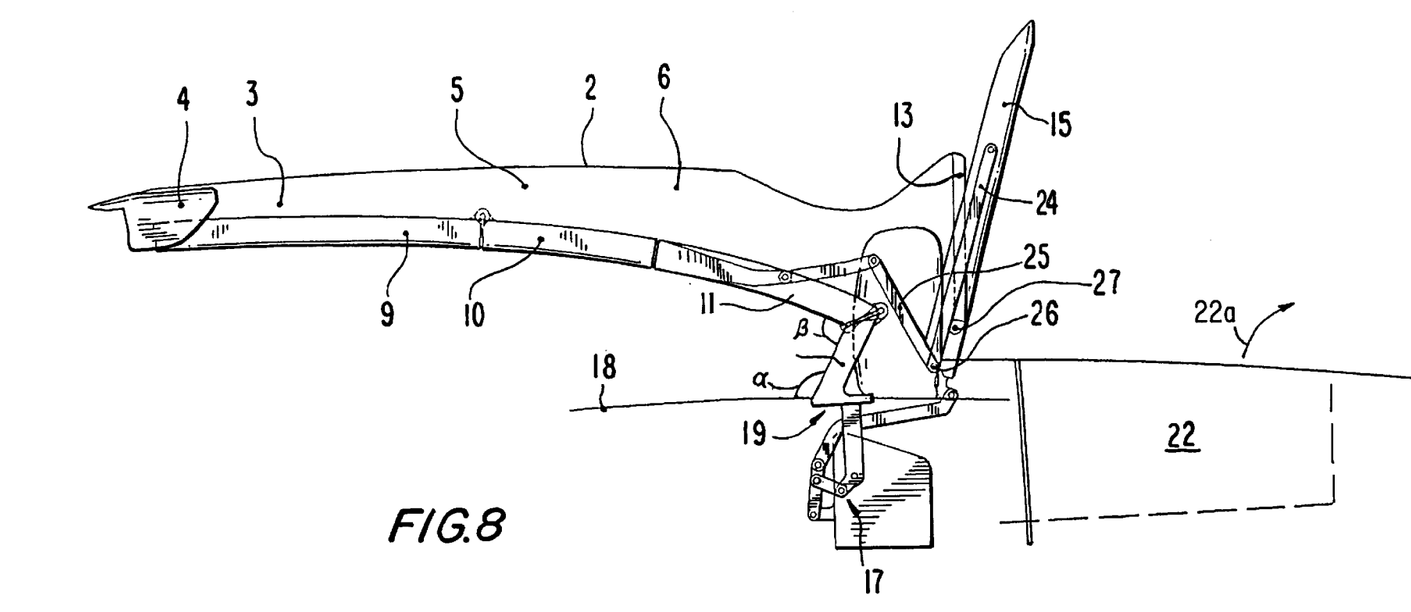
FIG. 8 shows a view similar to that of FIG. 6, with the rear clamp swung open completely.
Figure 9:
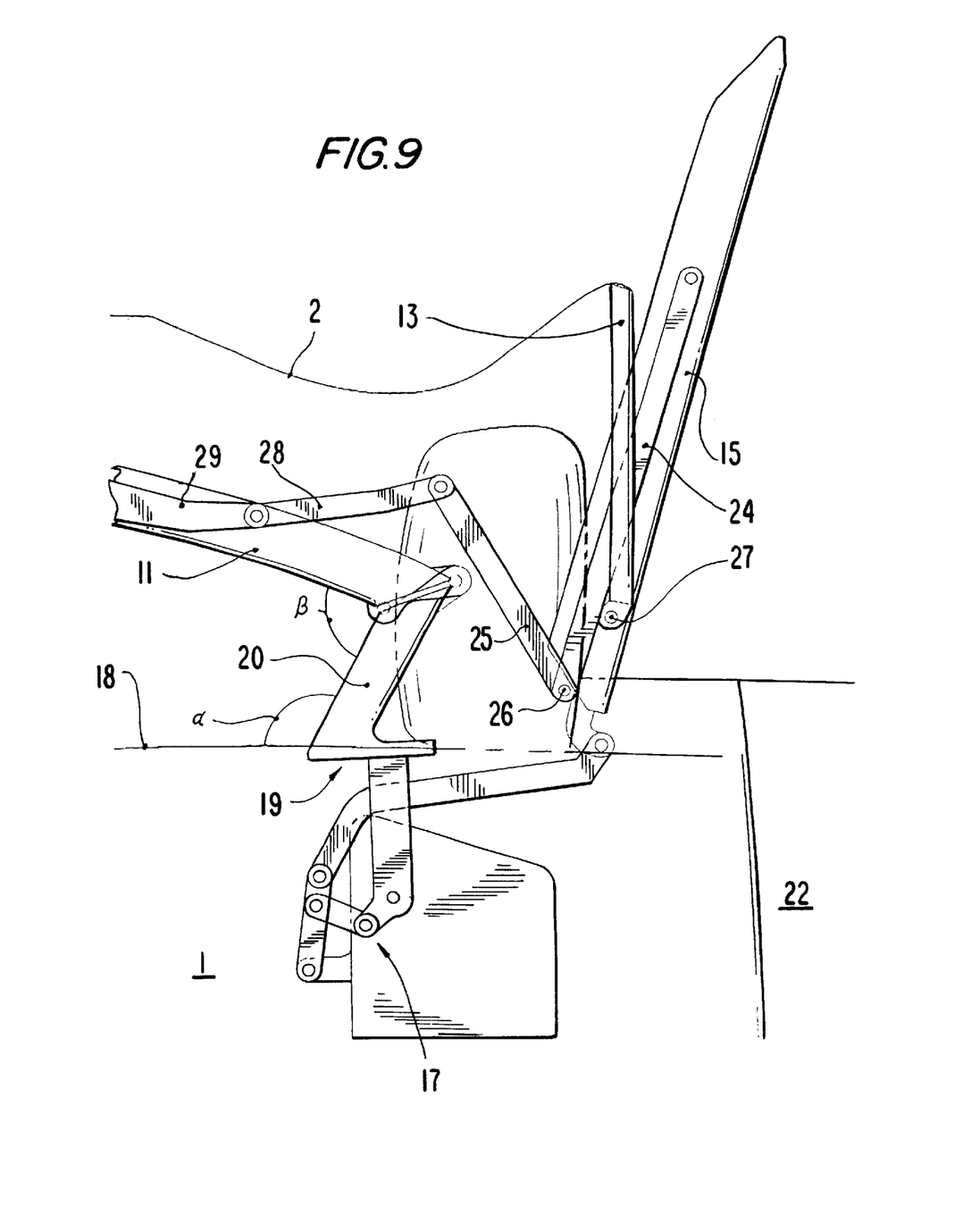
FIG. 9 shows a detailed view of the rear roof region during the movement phase of FIG. 8.
Figure 10:
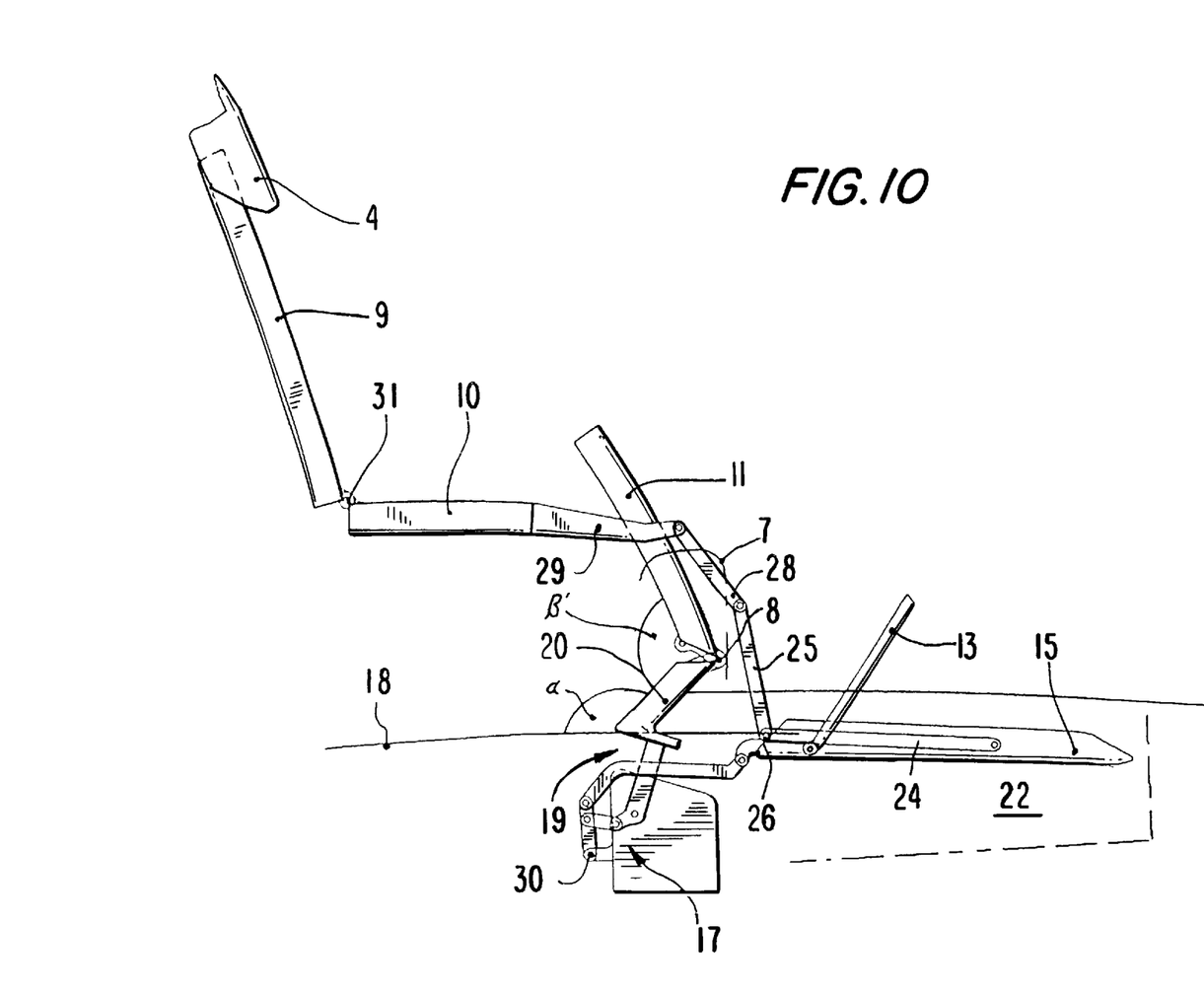
FIG. 10 shows the roof during the further swiveling up in a side view.
Figure 11:
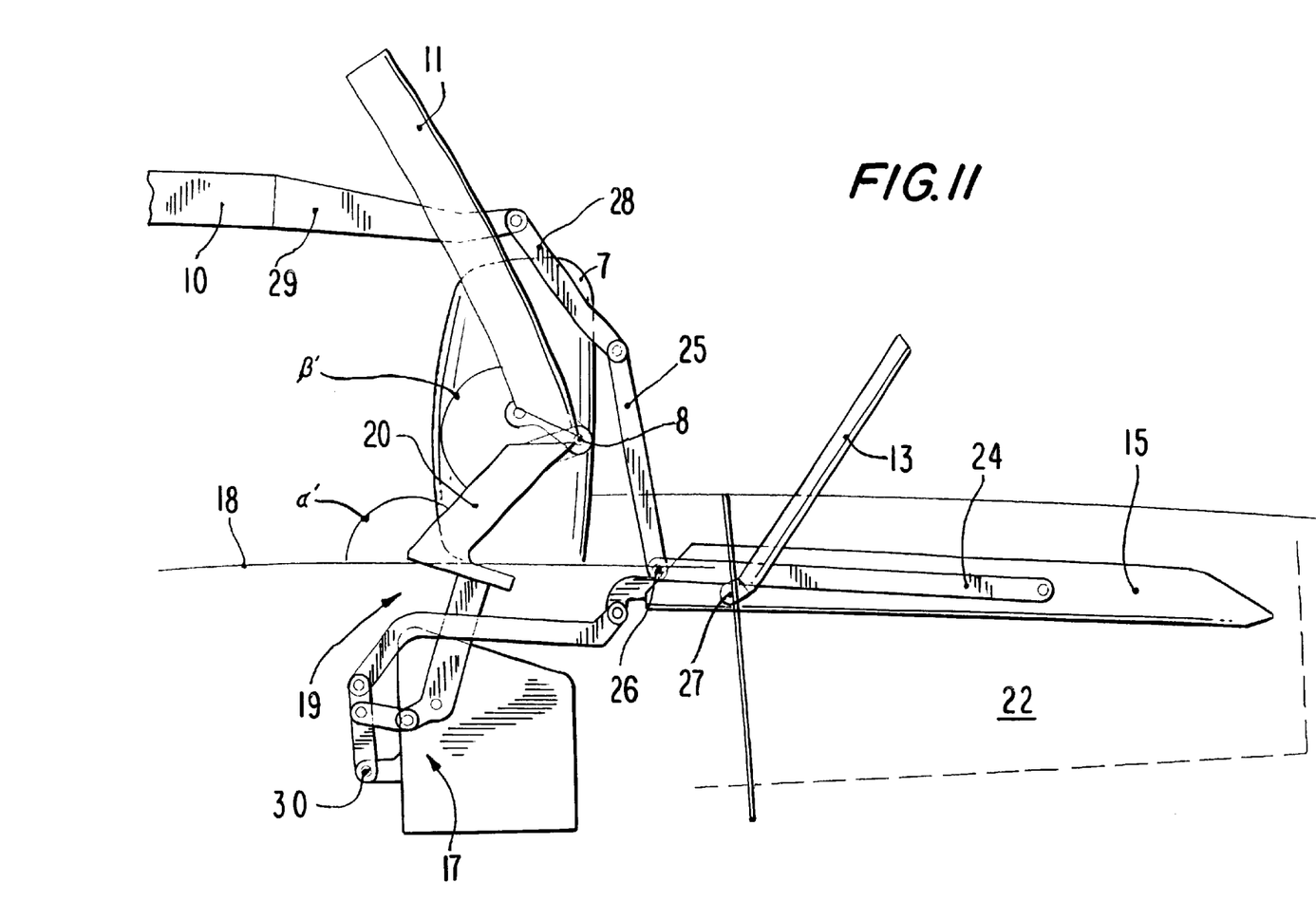
FIG. 11 shows a detailed view of the rear roof region of FIG. 10.
Figure 12:
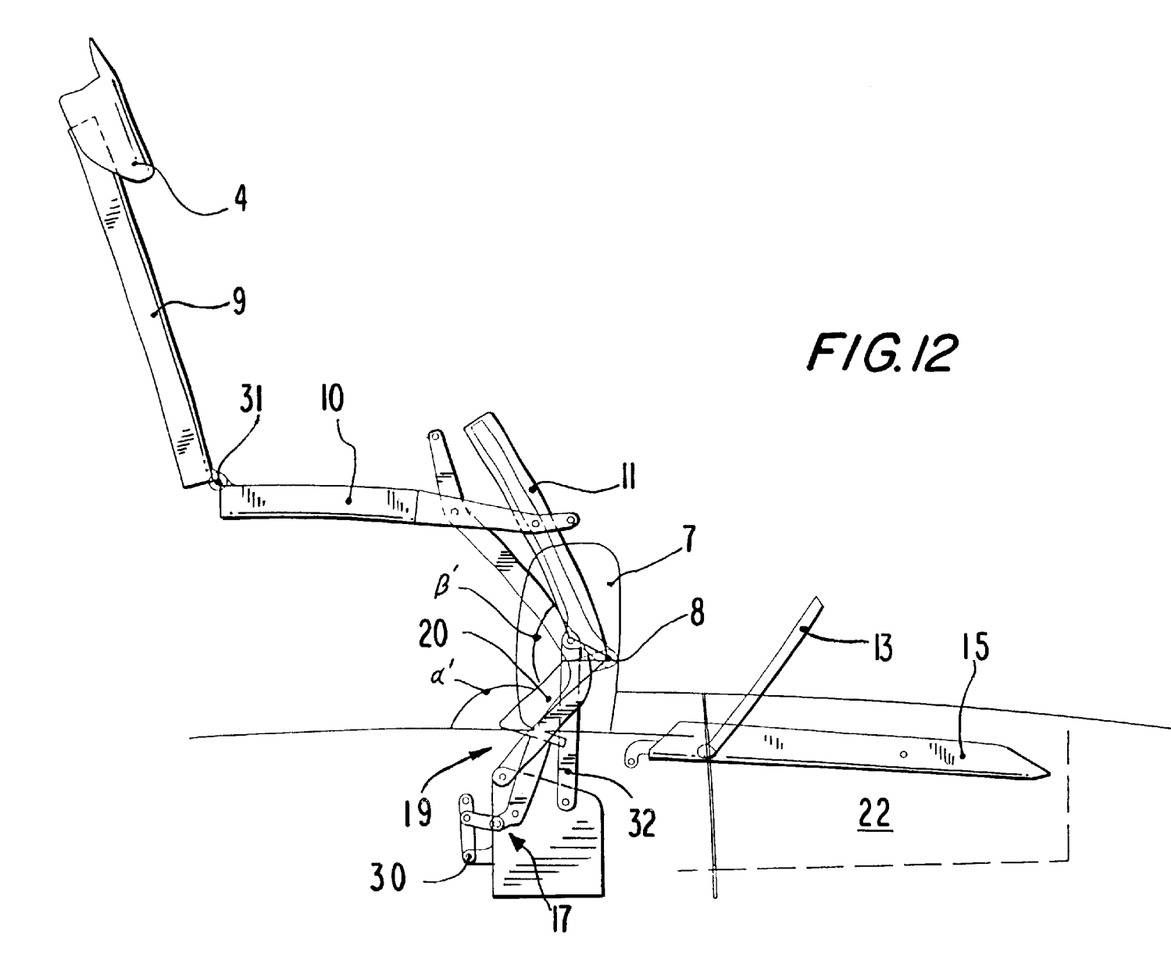
FIG. 12 shows a view similar to that of FIG. 10, a lever for the forced coupling of the swiveling open of the rear roof frame part and the swiveling open of the roof being shown in the drawing.

At least a partial region 20 of the connecting frame part 19 above the window parapet 18 encloses, in the driving direction, an obtuse angle α with the window parapet 18. In the example, the connecting frame part 19 extends as a whole essentially in the vertical direction. Alternatively, it is also possible for the connecting frame part 19 as a whole to extend upward at the rear and, as a whole, to enclose an obtuse angle α between the driving direction F and the window parapet 18. The partial region 20 of the connecting frame part 19 need not be linear; instead, as indicated in FIG. 3, it can have a curved contour 21, and thus ease the layout of the lines. However, even in the case of a linear contour of the partial region 20, a textile folding top, which is stretched over this partial region 20 of the connecting frame part 19, can have a rounded contour, approximately as indicated by the line 21 in FIG. 3. As a result, a flowing transition develops from the folding top into the window parapet line 18 without the need to form an acute angle α. Optically therefore, an approximation is created of a design element, which is frequently selected for vehicles with a fixed roof.

The connecting frame part 19 is constructed as a separate component from the frame part 11 and connected with it so that it can be swiveled. Without this ability of the parts 10, 11 to swivel relative to one another, the connecting frame part 19, during the stowing away of the folded roof, would essentially have to be able to protrude vertically downward, in order to make a horizontal position of the frame part 11 possible in the box 22 for the folding top. With that, the roof 2, as a whole, would come into a very low stowed away position, as a result of which the available trunk space would be limited appreciably. In order to avoid this, the angle β between the connecting frame part 19 and the frame part 11 is enlarged while the roof 2 is being opened, so that the connecting frame part assumes essentially a horizontal position in the open position of the roof 2. Compared to the roof frame part 11, the connecting frame part 19 has an advantageously shorter length, so that, even when the two parts are placed parallel to one another in the box 22 for the folding top, the length of the folded roof 2 in the vehicle is not excessive.

While the folded top is being opened (FIGS. 4, 6, 8, 10, 12, 13), the rear clamps 15 initially are raised from the lid 16 of the box for the folded top and swiveled up towards the front about an axis 23, which is still stationary here. While the clamp 15 is being opened, the connecting frame 19 still remains at rest. Only the guide rods 24, 25, which are connected with the clamp 15, collapse against one another about the swiveling axis 26, and the rear window 13, which is also hinged to the clamp 15 over an axis 27, is swiveled forward, as a result of which the roof 2, which is covered with a textile material here, loses its tension.

In the position, in which the clamp 15 (FIG. 8) is swiveled completely open, the lid 16 of the box for the folded top can be opened in the direction of the arrow 22, so that the opening of the box 22 for the folded top is free for stowing the roof 2.

Figure 14:
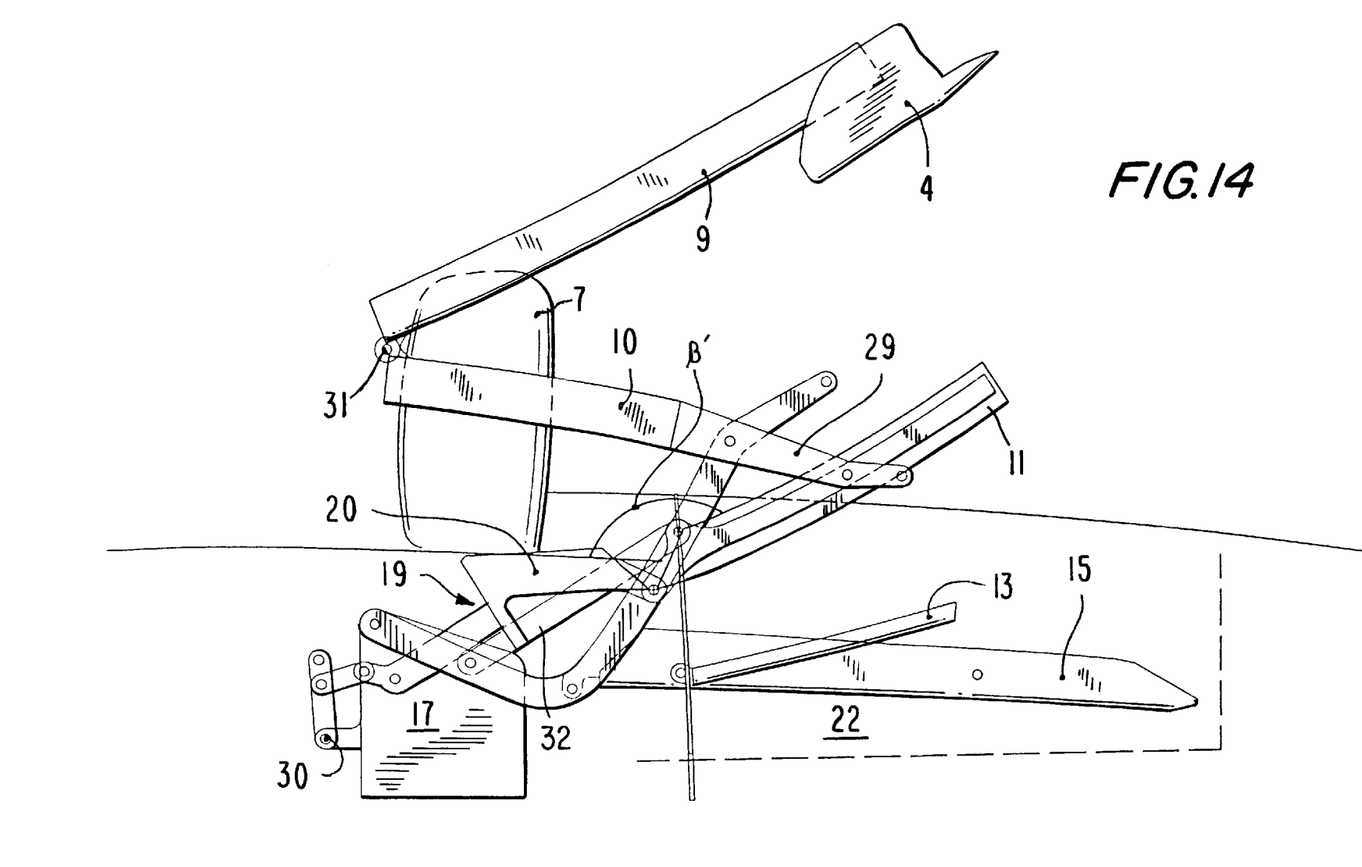
FIG. 14 shows a view similar to that of FIG. 13, a lever for the forced coupling of the swiveling of the rear roof frame part with respect to the main bearing and of the roof with respect to the main bearing being shown in the drawing.
Figure 15:
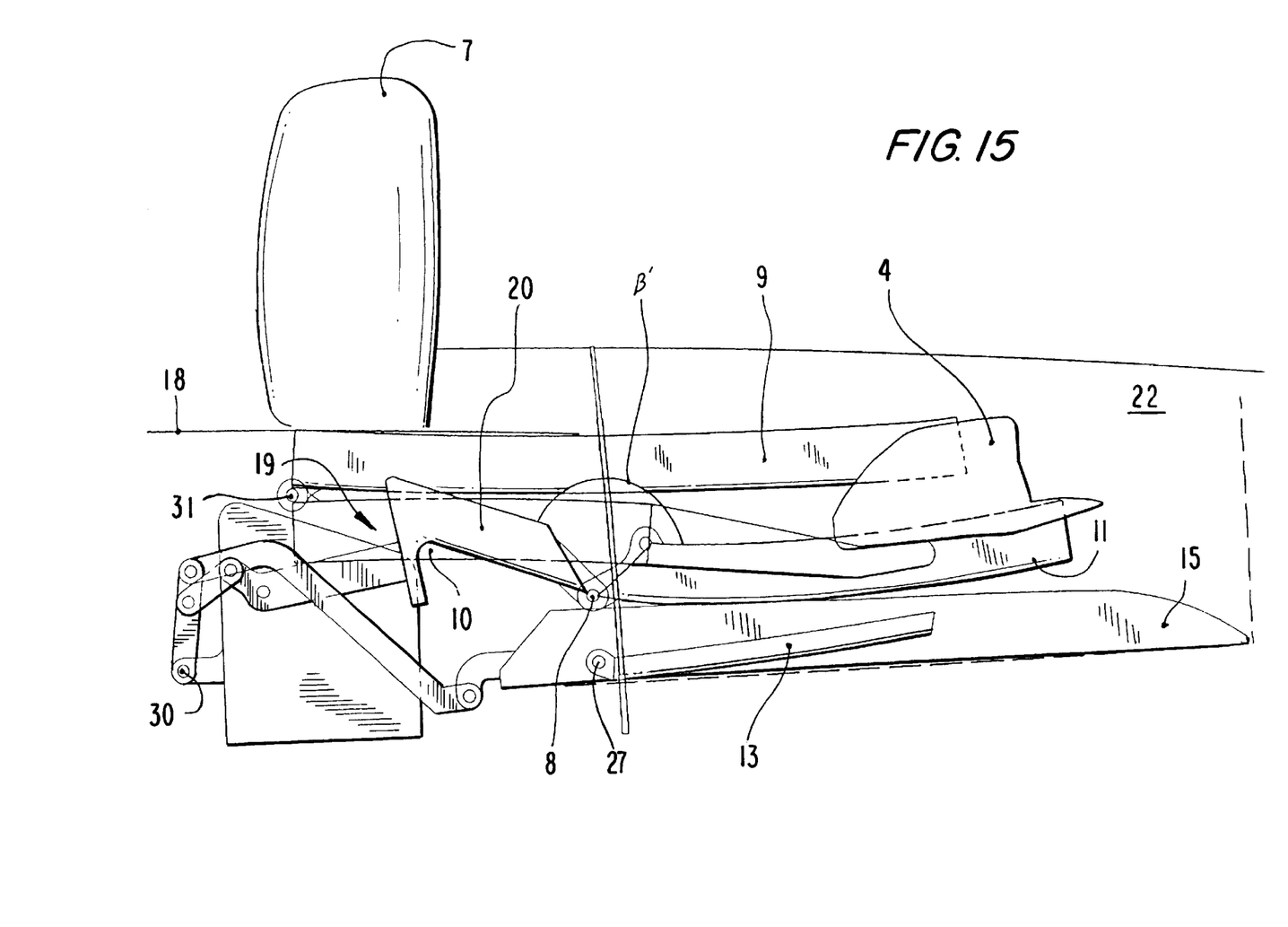
FIG. 15 shows the roof in the completely opened position and put away in the folding top box.

During the further swiveling open, the roof 2 as a whole is moved over several guide rods, of which only some are drawn in order to improve the clarity, to form a Z-shaped fold, so that it can be stowed away in the box 22 for the folding top. It can be seen in FIG. 10 that, when the clamp 15 is placed in the box 22 for the folding top, the guide rods 24 and the joint 26 are not shifted relative to the clamp 15 and instead are stowed away with the latter. As a result, the front part 9 of the roof is swiveled up at the swiveling axis 31 relative to the middle part 10 of the roof over the further, connecting guide rods 25, 28, 29. In addition, the connecting frame part 10 is swiveled about the main bearing 17 in the rearward direction, so that the angle α enlarges to an angle α'. At the same time, the frame part 11, swiveling about the horizontal axis 8, is lifted up from the connecting frame part 19, as a result of which the angle β is enlarged to the angle β'. The swiveling of the connecting frame part 19 relative to the main bearing 17 and the swiveling of the frame part 11 relative to the connecting frame part 19 are forcibly coupled over a lever 32, one end of which is hinged in the region of the main bearing 17 and the other end at the rear roof part 11. For the sake of clarity, this lever 32 has been drawn only in FIGS. 12 and 14. It ensures that the angles α' and β' are not enlarged independently of one another. As the connecting frame part 19 is swiveled up increasingly, the angle between the lever 32 and the rear frame part 11 is also enlarged by the lever 32.

Figure 13:
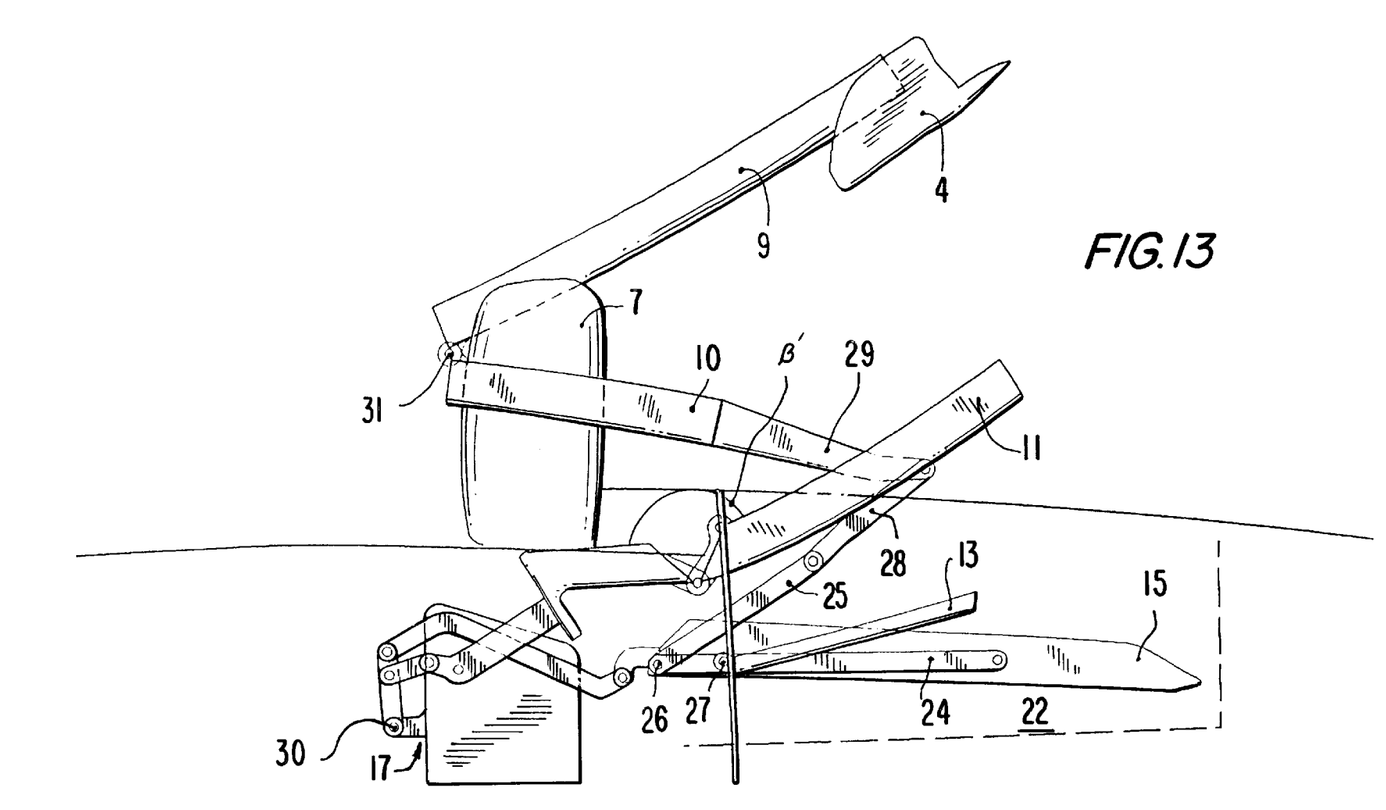
FIG. 13 shows the further folding of the roof into the folding top box in the rear region of the vehicle.

The angle β, which is between 50° and 130° in the closed position, depending on the construction of the connecting frame part 19, opens up to an angle β' when the roof 2 is opened and, in the open position, is between 160° and 200° (FIG. 13).

As the roof is opened further, the front roof part 3 is swiveled up further about the axis 31 relative to the middle roof part 5, until the roof parts 9 and 10 lie essentially horizontally on one another. Likewise, the middle roof part 5 is shifted over the guide rods 25, 28 and 29 relative to the rear roof part 6 in such a manner, that the parts lie on top of one another in the open position of the roof 2. The frame parts 9, 10 and 11 are then folded in Z-shaped fashion on top of one another (FIG. 13). The connecting frame parts 19 and rear frame parts 11, which are essentially parallel to one another, one behind the other, do not protrude in length beyond the clamp 15 or the front frame part 3, so that the space for stowing the roof 2 is enlarged only insignificantly, if at all. It is of primary importance here that the parts 19 and 11 can be swiveled relative to one another and reach an almost parallel position. On the other hand, without this ability to swivel, the angular position of the parts in the closed position of the roof 2 would have to be retained and, with that, the space for stowing the inserted roof would have to be enlarged considerably.

At least in the region above the window parapet, in which an obtuse angle α is enclosed with the window parapet 18, the connecting frame part 19 is U-shaped in cross section, in order to enable the side window to be shifted, in spite of the obtuse angle α. A channel for guiding a side window is created between the legs of the connecting frame part 19 by the U-shaped cross section, so that this window can be moved up and down.

What is claimed is:

1. A convertible vehicle comprising a vehicle body having a window parapet and a main bearing disposed at a fixed position on the vehicle body and located lower than said parapet, a roof structure on said vehicle body movable between an up position and a stored position, said roof structure comprising at least three frame parts including a rear frame part, a second frame part juxtaposed to said rear frame part, and a connecting frame part pivotally connected to said main bearing, said connecting frame part having a partial region disposed higher than said parapet when said roof structure is in said up position, a pivotal connection pivotably connecting said rear frame part and said partial region of said connecting frame part such that said pivotal connection is disposed higher than said parapet when said roof structure is in said up position, said partial region of said connecting frame part being disposed at an obtuse angle relative to said parapet when said roof structure is in said up position, said second frame part having a rear end portion, said rear frame part having a front end portion, said rear and front end portions being juxtaposed to one another when said roof structure is in said up position, said front end portion of said rear frame part being separated from said rear end portion of said second frame part upon movement of said roof structure from said up position toward said stored position.

2. A convertible vehicle according to claim 1 wherein said parapet has a forward parapet portion disposed forwardly on the vehicle body relative to said connecting frame part when said roof structure is in said up position, said obtuse angle being formed by said forward parapet portion and said partial region of said connecting frame part.

3. A convertible vehicle according to claim 1 wherein said rear frame part has a longitudinal length greater than the longitudinal length of said connecting frame part.

4. A convertible vehicle according to claim 1 wherein said roof structure includes a textile covering about said rear frame part.

5. A convertible vehicle according to claim 1 wherein said rear frame part is disposed generally horizontally and parallel to said connecting frame part when said roof structure is in said stored position.

6. A convertible vehicle according to claim 1 wherein said partial region of said connecting frame part provides a relative angular relationship between said rear frame part, said partial region of said connecting frame part and said parapet when said roof structure is being moved between said up and said stored positions.

7. A convertible vehicle according to claim 6 wherein said relative angular relationship is between a first angle formed by said rear frame part and said partial region of said connecting frame part and a second angle which corresponds to said obtuse angle formed by said partial region of said connecting part and said parapet.

8. A convertible vehicle according to claim 1 wherein said partial region of said connecting frame part is disposed at an angle relative to said rear frame part when said roof unit is in said up position of between 50 degrees and 130 degrees.

9. A convertible vehicle according to claim 8 wherein the last said angle changes as said roof unit moves between said up position and said stored position.

10. A convertible vehicle according to claim 1 wherein said partial region of said connecting frame part is disposed at an angle relative to said rear frame part when said roof unit is in said stored position of between 160 degrees and 200 degrees.

11. A convertible vehicle comprising a vehicle body having a window parapet, a roof structure on said vehicle body movable between an up position and a stored position, said roof structure comprising at least two roof sections including a rear roof section, said rear roof section including a rear frame having a rear frame part, a connecting part, a pivotal connection pivotally connecting said connecting part to said rear frame part, said connecting part having at least a section disposed higher than said parapet when said roof structure is in said up position, said pivotal connection being disposed higher than said parapet when said roof structure is in said up position, said section of said connecting part being disposed at an obtuse angle relative to said parapet when said roof structure is in said up position, said section of said connecting part providing a relative angular coupling relationship between said rear frame part, said section of said connecting frame part and said parapet when said roof structure is being moved between said up and said stored positions, said relative angular coupling relationship being between a first angle formed by said rear frame part and said section of said connecting part and a second angle which corresponds to said obtuse angle formed by said section of said connecting part and said parapet, said relative angular coupling relationship providing for simultaneously increasing said first and second angles as said roof structure moves toward said stored position.

* * * * *